Figure 1:
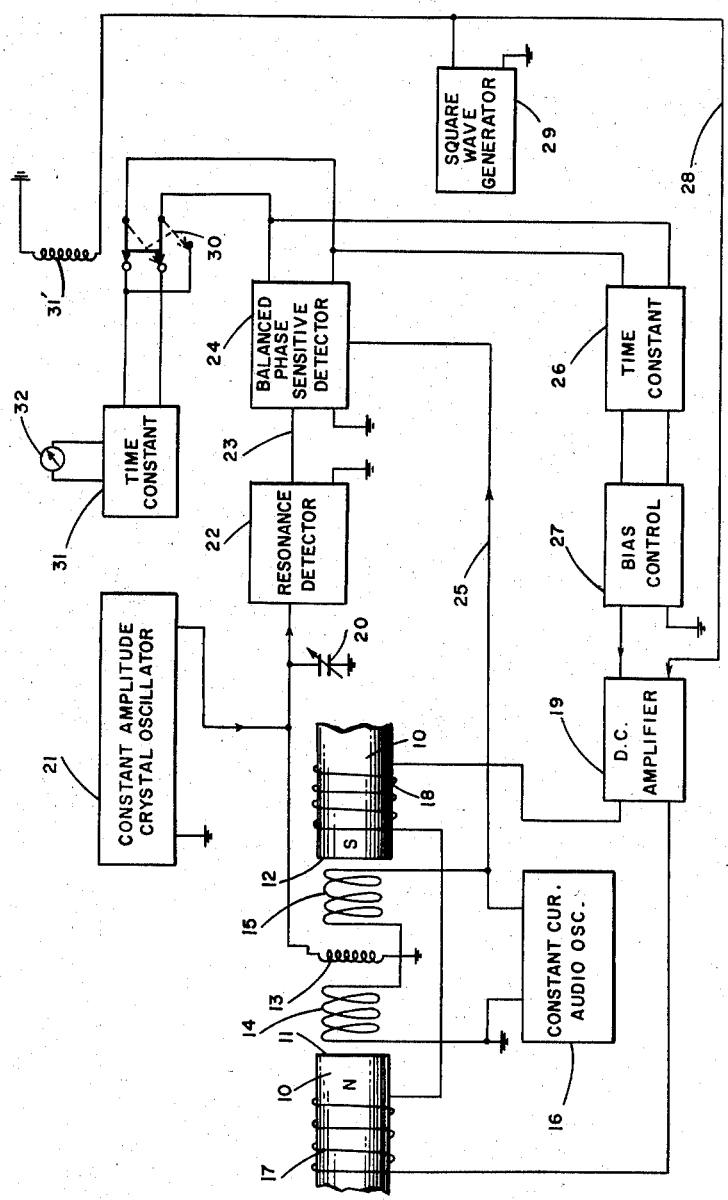

2,894,199
MAGNETIC RESONANCE APPARATUS

Francois F. Kirchner, Ridgefield, Conn., assignor, by mesne assignments, to Schlumberger Well Surveying Corporation, Houston, Tex., a corporation of Texas Application December 12, 1955, Serial No. 552,402

4 Claims. (Cl. 324—.5)

The present invention relates to magnetic resonance apparatus, and more particularly to new and improved apparatus for utilizing nuclear and other paramagnetic resonance phenomena, and which is particularly useful for non-destructive chemical analyses of materials and for controlling magnetic fields.

Electron and nuclear paramagnetic resonance phenomena have been utilized in the past for various purposes, for example in non-destructive chemical analyses and for controlling magnetic fields. In general, a sample exhibiting paramagnetic properties is placed in a unidirectional magnetic field that is substantially homogeneous within the sample. A coil, disposed perpendicularly to the unidirectional magnetic field generates an alternating magnetic field in the sample. The frequency of alternating magnetic field is selected equal to the resonance precession frequency of the paramagnetic particles in the unidirectional field. Either or both of the magnetic fields may be modulated, and the resonance observed for example in one of the following ways: (1) as a result of the absorption of the alternating magnetic field; or (2) as a result of the voltage induced in a coil at right angles to both the unidirectional magnetic field and the alternating field inducing coil.

In chemical analyses it is often desirable that the magnetic resonance apparatus give a direct indication of a selected property of the material under test. However, in general, the equipment presently available produces only a resonance curve or the derivative thereof, which must be carefully interpreted in order to obtain an indication of the selected property. Further for controlling unidirectional magnetic fields it is desirable that the resonance be automatically interpreted so as to effect substantially instantaneous control of the magnetic field. Also, where it is desired to control the unidirectional magnetic field utilized in magnetic resonance equipment for chemical analyses, two substantially separate resonance equipments are usually required, one for chemical analysis, the other for field control.

Accordingly, it is a primary object of the present invention to provide new and improved magnetic resonance apparatus which selects a significant portion of the resonance response and produces a corresponding signal automatically.

Another object of the present invention is to provide new and improved magnetic resonance apparatus, useful in chemical analyses, which gives a direct indication of a desired characteristic.

A further object of the present invention is to provide new and improved magnetic resonance apparatus for automatically controlling unidirectional magnetic fields.

Still another object of the present invention is to provide new and improved magnetic resonance apparatus which may be utilized for chemical analyses and for magnetic field control, simultaneously.

These and other objects of the invention are attained by providing means for alternately varying the unidirectional magnetic field such that during first time intervals said unidirectional field has an intensity that is greater by a predetermined amount than the known intensity at which the resonance precession frequency of particular paramagnetic particles is equal to the frequency of the alternating magnetic field, and during second time intervals, between said first time intervals and of equal duration therewith, said unidirectional field has an intensity that is less than said known intensity by the same predetermined amount. The resonance signal detected during said time intervals may be measured as a function of given property of the sample under investigation. Further, the signals detected during said first time intervals may be compared to those detected during said second time intervals, and the magnitude and polarity of the difference utilized to accurately control the unidirectional field.

Figure 2:
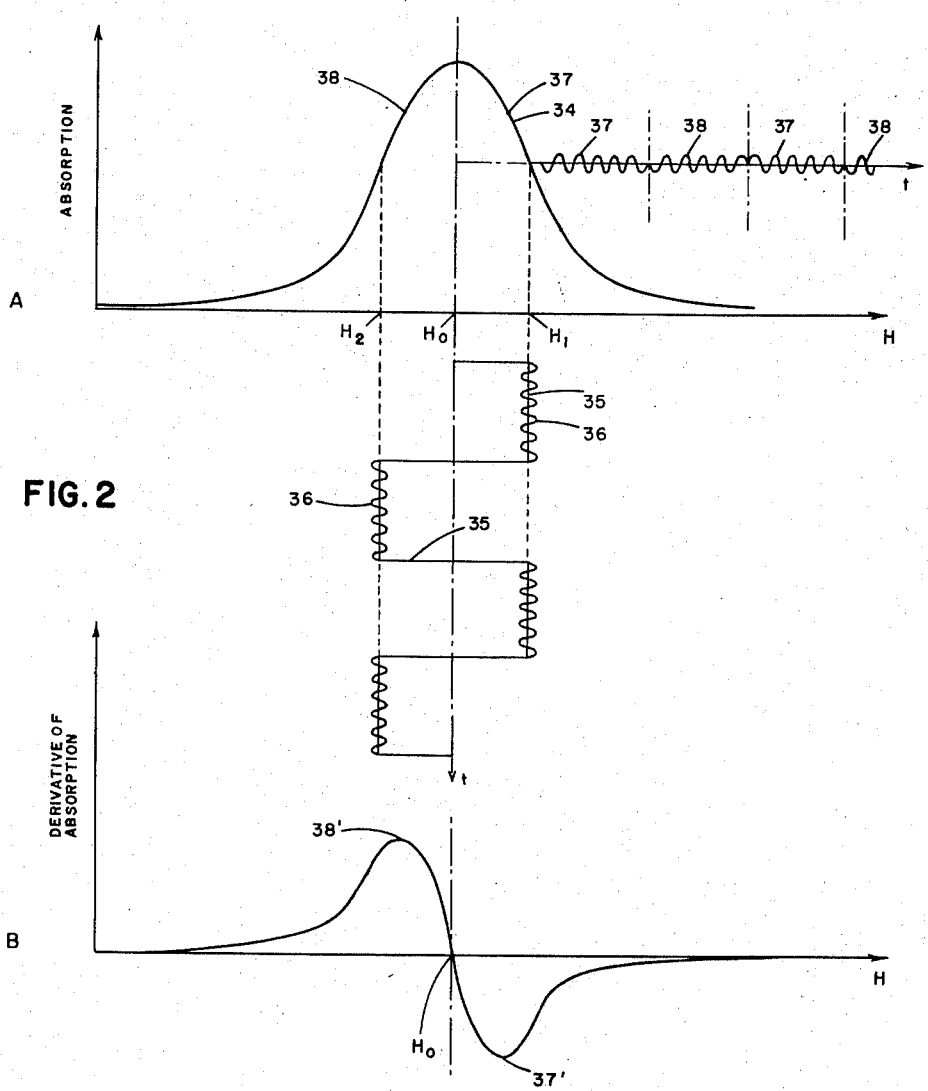

The invention will be more fully understood with reference to the accompanying drawings, in which:

Fig. 1 is a block diagram of a magnetic resonance apparatus incorporating a typical embodiment of the present invention; and Fig. 2 is a series of wave diagrams utilized to explain the operation of the apparatus shown in Fig. 1.

In Fig. 1 there is shown a typical magnetic resonance spectrometer which has been modified to incorporate the present invention. A magnet 10 is disposed so as to have a narrow gap between the pole faces 11 and 12 thereof between which a unidirectional, substantially homogeneous magnetic field passes. Disposed perpendicularly to the unidirectional magnetic field between pole faces 11 and 12 is a R.F. coil 13 into which a sample to be tested may be placed. On either side of coil 13 between pole faces 11 and 12 are placed series-connected modulating coils 14 and 15, the axes of which are parallel to the unidirectional field. Coils 14 and 15 are adapted to be activated with a constant amplitude, low frequency current from audio oscillator 16, which thereby amplitude modulates the unidirectional magnetic field at said low frequency rate. In addition, wound on magnet 10 are series connected sweep coils 17 and 18 which are adapted to receive current from D.C. amplifier 19.

R.F. coil 13 is electrically connected in parallel with tuning capacitor 20. Coil 13 and capacitor 20 are adapted to be supplied with constant intensity, high frequency current from crystal controlled oscillator 21. Capacitor 20 is adapted to be tuned such that the tank circuit comprising coil 13 and capacitor 20 is at resonance at the frequency of oscillator 21. The high frequency signal appearing across coil 13 and capacitor 20 is applied to resonance detector 22, which may comprise a hight frequency amplifier, a detector and an audio oscillator, as well as a negative feedback circuit to make detector 22 relatively insensitive to variations in gain. The apparatus thus far described finds its counterpart in copending application Serial No. 552,403, filed December 12, 1955, by F. F. Kirchner and L. S. Jimerson, Jr., for "Magnetic Resonance Apparatus," to which reference may be had for further details.

The output 23 of resonance detector 22 consists of an audio signal varying at the frequency of oscillator 16. Output 23 is coupled to the input of a balanced phase sensitive detector 24, receiving a reference or sensitizing signal from oscillator 16 via conductor 25. As is well-known, the output of detector 24 will be a D.C. signal, the potential of which is proportional to the audio signal on conductor 23, and the polarity of which is determined by whether the signal on conductor 23 is in phase or 180° out of phase with the reference signal on conductor 25. The output of phase sensitive detector 24 is applied to a long time constant circuit 26, which provides a signal representing the average output of balanced phase sensitive detector 24 over an extended period of time.

The output of time constant circuit 26 is applied to bias control circuit 27 providing a rate of change of its D.C. output proportional to the intensity of the output of circuit 26 and of the same polarity. The output of bias control 27 is applied to one input of D.C. amplifier 19 to control the amount of current applied through series connected coils 17 and 18.

In addition, there is applied to a second input 28 to D.C. amplifier 19 a square wave of low frequency from square wave generator 29. Thus the output of D.C. amplifier applied to coils 17 and 18 is a square wave, the average value of which is varied by bias control 27.

The output of phase sensitive detector 24 is also applied to a synchronous rectifying switch 30, which is switched in synchronism by the output of square wave generator 29 by means of relay 31. The output of switch 30 is applied through time constant circuit 31 to meter 32, which gives a continuous indication of the voltage output of circuit 31.

In operation assume that it is desired to detect a function of proton resonance in the sample placed in coil 13 and that the unmodulated unswept magnetic field provided by magnet 10 is 2000 gauss. Under these conditions oscillator 21 may provide alternating current of frequency of 8.5 megacycles, the resonance precession frequency for proton resonance at 2000 gauss. Audio oscillator 16 may provide a constant current at a frequency of 30 cycles/sec. providing a variation in the unidirectional magnetic field of $10^{-3}$ gauss. Square wave generator 29 may have a frequency on the order of 1 cycle/sec. Bias control 27 may provide a variation in the intensity of the field of magnet 10, for example, between + or −10 gauss, while square wave generator 29 may provide a variation of 0.1 gauss, peak to peak, although the actual value to be selected will depend on factors to be discussed hereinafter.

The operation of the foregoing apparatus will be better understood with reference to Fig. 2A wherein curve 34 represents a typical absorption curve for proton resonance plotted against various values of H of the unidirectional magnetic field through the sample. The value $H_0$, which represents the intensity of the field H at which the free precession frequency of the particles in the sample is equal to the frequency supplied by oscillator 21 may be determined by the relation $$H_0 = \frac{2\pi f}{\gamma} \quad (1)$$

where $f$ is the frequency of oscillator 21 and $\gamma$ is the gyromagnetic ratio. For proton resonance $\gamma = 2.67 \times 10^4$.

As the field H is increased toward the value $H_0$, it can be seen that the absorption increases to a maximum at $H_0$ and thereafter decreases symmetrically with the increase. In accordance with the present invention, the field H is switched periodically between two steady values $H_1$ and $H_2$, $H_1$ being displaced on one side of $H_0$ by a predetermined amount and $H_2$ being displaced on the other side of $H_0$ by the same predetermined amount, i.e. $H_1 - H_0 = H_0 - H_2$. As shown by the square wave 35 in Fig. 2, field of intensity $H_1$ is applied for a first period of time and then switched substantially instantaneously to value $H_2$ for a second equal period of time, in accordance with the output of square wave generator 29 and D.C. amplifier 19. In addition, the field H is modulated continuously by a sine wave 36 of constant amplitude, frequency and phase, by means of oscillator 16. It can be seen that when the field H is at intensity $H_1$, the modulation 36 will produce a modulation on the absorption curve of a first phase 37, the intensity of which is proportional to the slope of curve 34 at value $H_1$. When the intensity of field H is at $H_2$, the modulation 36 thereof will produce a modulation of the absorption 38 of opposite phase to phase of modulation 37, the intensity of which depends on the slope of the absorption curve at intensity $H_2$.

Since the curve 34 is symmetrical about $H_0$, it can be seen that if, in fact, the midpoint between $H_1$ and $H_2$ corresponds to $H_0$, then the intensity of modulations 37 and 38 will be equal. On the other hand, if the magnet 10 drifts such that its average value is no longer $H_0$, curve 34 will be displaced and the slopes at intensities $H_1$ and $H_2$ will be different, and thus modulations 37 and 38 will have different intensities.

In accordance with the present invention this difference in the intensities of modulations 37 and 38, along with their inherent differences in phase, are utilized to control the magnet 10 such that its average intensity in the absence of square wave 35 will always be $H_0$. To this end the modulations 37 and 38 are detected in resonance detector 22 and applied to the input of balanced phase sensitive detector which gives an output proportional to the intensity of waves 37 and 38 but of one polarity for detected modulation 37 and of opposite polarity for modulation 38. The output of detector 24 is applied to a long time constant circuit 26. Thus, if detected modulations 37 and 38 are, in fact, equal so that the D.C. outputs of opposite polarity of detector 24 are equal in intensity, this will be averaged out to zero by time constant circuit 26 and the setting of bias control 27 will not be changed, i.e. there will be no error signal applied to bias control 27, and setting of the bias will remain constant. On the other hand, if, for example, modulation 37 becomes larger than modulation 38 due to the drift of magnet 10, then the output of one polarity from detector 24 will be greater than the output of the opposite polarity and a D.C. signal of polarity indicating the direction of the drift and of intensity indicating the amount of the drift will be applied to bias control 27 which will vary the direct current applied through coils 17 and 18 at a rate proportional to the said intensity to bring the unidirectional field between the pole faces 11 and 12 of magnet 10 back to an average value $H_0$.

In addition, the D.C., reversing polarity output of detector 24 is changed back to a constant polarity signal by means of rectifier 30, applied through short time constant circuit 31 to filter out transient effects and thence to a meter 32 which will thus give a continuous indication of the slope of the absorption curve 34 at field intensities $H_1$ and $H_2$.

In practice it is best to select the values $H_1$ and $H_2$ at points such as points 37 and 38 where the slope of the absorption curve is a maximum. This may readily be determined by first obtaining the derivative curve 39 shown in Fig. 2B of a representative sample in the manner mentioned in the aforementioned copending application and locating the peaks 37' and 38' of this derivative curve. These peaks 37' and 38' in turn correspond to the points of maximum slope 37 and 38, respectively, of absorption curve 34, and the square wave output of generator 29 may be adjusted accordingly.

In addition to controlling unidirectional magnetic fields, this invention provides particular utility for simultaneously determining moisture content of materials, such as starches. For starches having moisture content between, say, 5 and 15%, the slope of the absorption curve and thus the indication on meter 32 will be a direct function of this moisture content.

It will be understood that the present invention may be utilized for detecting resonance and for controlling magnetic fields with other types of magnetic resonance apparatus. For example, other types of absorption spectrometers may be used such as, for example, those in which coil 13 is included in an R.F. bridge or those in which coil 13 is included as a portion of the tank circuit of the R.F. oscillator. In addition, other types of spectrometers may be employed such as the so-called induction spectrometer in which two coils at right angles to each other and to the unidirectional magnetic field are employed, to one of which the oscillator is connected, to the other of which is connected the detector circuit.

While in the representative embodiment described above, the fields $H_1$ and $H_2$ are symmetrical about the named value H of magnet 10, it will be understood that by merely adjusting the permanent bias to coils 17 and 18 the average unidirectional field may be made any desired value, and the fields $H_1$ and $H_2$ will be symmetrical thereabout. It will be understood, therefore, that the invention should not be limited by the embodiment described above but should be afforded the full scope of the appended claims.

I claim:

1. Magnetic resonance apparatus comprising means for applying an alternating magnetic field of predetermined frequency to a sample of material to be investigated, means for applying a unidirectional magnetic field perpendicularly to said alternating magnetic field through said sample, means for controlling said unidirectional magnetic field such that said unidirectional field has a first substantially constant intensity during first time intervals and a second substantially constant intensity different from said first intensity during second time intervals between said first time intervals, the duration of said first time intervals being substantially equal to the duration of said second time intervals, means for adjusting said unidirectional magnetic field such that the average intensity thereof is substantially equal to the intensity at which the magnetic resonance frequency of particular paramagnetic particles in said sample is substantially equal to said predetermined frequency, means for modulating said unidirectional field at a given frequency, and means for detecting magnetic resonance phenomena in said sample during said time intervals at said given frequency.

2. Magnetic resonance apparatus comprising means for applying an alternating magnetic field of predetermined frequency to a sample of material to be investigated, means for applying a unidirectional magnetic field perpendicularly to said alternating magnetic field through said sample, means for controlling said unidirectional magnetic field such that said unidirectional field has a first substantially constant intensity during first time intervals and a second substantially constant intensity different from said first intensity during second time intervals between said first time intervals, the duration of said first time intervals being substantially equal to the duration of said second time intervals, adjustable means for adjusting said unidirectional magnetic field such that the average intensity thereof is substantially equal to the intensity at which the magnetic resonance frequency of particular paramagnetic particles in said sample is substantially equal to said predetermined frequency, means for modulating said unidirectional field at a given frequency, means for obtaining a first signal which varies as a function of magnetic resonance in said sample during said first time intervals at said given frequency and for obtaining a second signal which varies as a function of resonance in said sample during said second time intervals at said given frequency, and means for controlling said adjustable means in accordance with the difference between said first and second signals.

3. Magnetic resonance apparatus comprising means for applying an alternating magnetic field of predetermined frequency to a sample of material to be investigated, means for applying a unidirectional magnetic field perpendicularly to said alternating magnetic field through said sample, means for controlling said unidirectional magnetic field such that said unidirectional field has a first substantially constant intensity during first time intervals and a second substantially constant intensity different from said first intensity during second time intervals between said first time intervals, the duration of said first time intervals being substantially equal to the duration of said second time intervals, means for modulating said unidirectional field at a given frequency, means for detecting magnetic resonance in said sample during said time intervals at said given frequency, means coupled to said detecting means for obtaining a first signal of one polarity during said first time intervals and a second signal of opposite polarity during said second time intervals, said signals representing the variation of said magnetic resonance with magnetic field intensity and means operable by said first and second signals for adjusting said unidirectional field such that said first signal is continuously substantially equal in amplitude to said second signal whereby the average intensity of said unidirectional field is substantially equal to the intensity at which the magnetic resonance frequency of particular paramagnetic particles in said sample is substantially equal to said predetermined frequency.

4. Magnetic resonance apparatus comprising means for applying an alternating magnetic field of predetermined frequency to a sample of material to be investigated, means for applying a unidirectional magnetic field perpendicularly to said alternating magnetic field through said sample, means for controlling said unidirectional magnetic field such that said unidirectional field has a first substantially constant intensity during first time intervals and a second substantially constant intensity difference from said first intensity during second time intervals between said first time intervals, the duration of said first time intervals being substantially equal to the duration of said second time intervals, means for modulating said unidirectional field at a given frequency, means for detecting magnetic resonance in said sample during said time intervals at said given frequency, means coupled to said detecting means for obtaining a first signal of one polarity during said first time intervals and a second signal of opposite polarity during said second time intervals, said signals representing the variation of said magnetic resonance with magnetic field intensity, means operable by said first and second signals for adjusting said unidirectional field such that said first signal is continuously substantially equal in amplitude to said second signal whereby the average intensity of said unidirectional field is substantially equal to the intensity at which the magnetic resonance frequency of particular paramagnetic particles in said sample is substantially equal to said predetermined frequency, and means for obtaining an indication of the amplitude of said first and second signals.

References Cited in the file of this patent

UNITED STATES PATENTS 2,589,494     Hershberger            Mar. 18, 1952

OTHER REFERENCES

Thomas et al.: Journal of Research of National Bureau of Standards, vol. 44, pp. 569–583 (June 1950).

Holder et al.: Physical Review, vol. 98, No. 1, April 1, 1955, page 265, paper I5; reprinted from Bulletin of the American Physical Society, vol. 29, No. 8, Dec. 28, 1954.